D. FORREST.
Car Wheel.
No. 67,036.
Patented July 23, 1867.
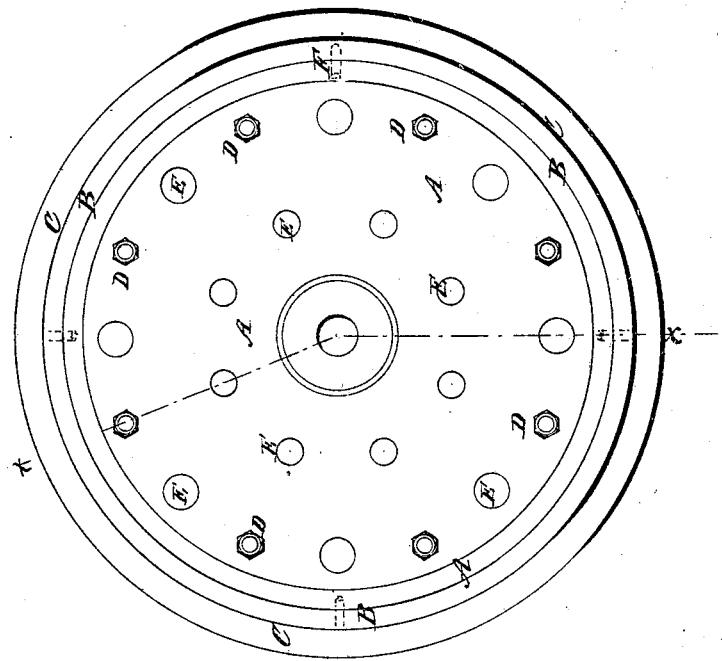

United States Patent Office.

DAVID FORREST, OF EASTPORT, MAINE, ASSIGNOR TO HIMSELF AND JAMES ELDRIDGE, OF THE SAME PLACE.

*Letters Patent No. 67,036, dated July 23, 1867.*

IMPROVED CAR-WHEEL.

*The Schedule referred to in these Letters Patent and making part of the same.*

TO ALL WHOM IT MAY CONCERN:

Be it known that I, DAVID FORREST, of Eastport, in the county of Washington, and State of Maine, have invented a new and improved Railroad Car-Wheel; and I do hereby declare that the following is a full, clear, and exact description thereof, which will enable others skilled in the art to make and use the same, reference being had to the accompanying drawings, forming part of this specification, in which—

Figure 1 is a side view of my improved wheel.

Figure 2 is a detail sectional view of the same, taken through the line $x\ x$, fig. 1.

Similar letters of reference indicate like parts.

My invention has for its object to furnish an improved car-wheel, so constructed that the parts most subject to wear or liable to be broken may be replaced when worn or broken, and which shall be very compact, and it consists in an improved car, formed by the combination of three separate and distinct parts with each other, as hereinafter more fully described.

A is the hub and body of the wheel, which are made solid in one piece in the ordinary manner. B is the tire or band of the wheel, which is made to fit closely upon the rim of the wheel, as shown in fig. 2. The tire B is made with several pins or cone-like projections upon its inner side, which enter slots or grooves formed in the rim of the wheel A, extending inward from the side of the wheel upon which the flange is applied, as shown in fig. 2, so as to hold the said tire from shifting its position upon the said rim. C is the part upon which the flange is formed. This part is made with a circular shoulder or projection upon its inner side, which fits into a circular groove formed in the body A of the wheel, and it is secured in place by bolts D passing through the piece C and through the body A of the wheel, as shown in figs. 1 and 3. Holes E, of any desired shape, size, or number, may be formed through the body A of the wheel and through the flange piece or guard C, as shown in figs. 1 and 2.

To take the wheel apart, the bolts D are removed and flange piece is lifted off, which allows the tire B to be lifted off.

By this construction, when one side of the tire B becomes worn, the wheel may be taken apart and the tire reversed, causing the wheel to last nearly twice as long as it otherwise would, and should the flange C become accidentally broken it can be removed and replaced with a new one, without its being necessary to take the wheel to the machine-shop to be repaired.

I claim as new, and desire to secure by Letters Patent—

The combination and arrangement of the body A, having an annular groove, removable annular flange-piece or guard C, having flange $e$, rim B having pins fitting into the transverse slots F in the periphery of the body A, all constructed as described, whereby the rim B is secured in place by means of the guard C, and reversed by removing said guard, substantially as described for the purpose specified.

DAVID FORREST.

Witnesses:
R. B. CLARK,
J. F. MATHEWS.